July 7, 1953   B. C. CHRISTENSEN   2,644,486
QUICK-OPENING VALVE
Filed Aug. 28, 1948   2 Sheets-Sheet 2
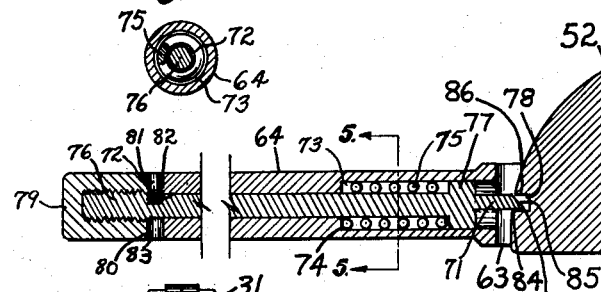
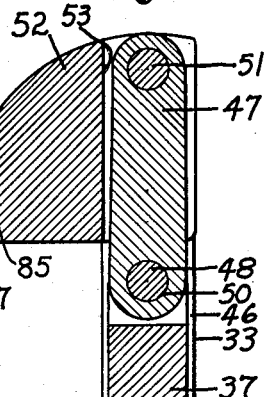
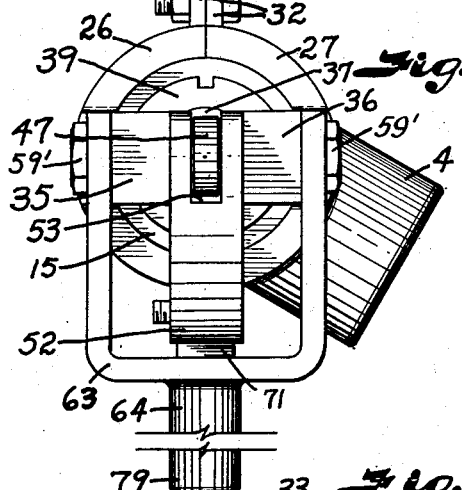
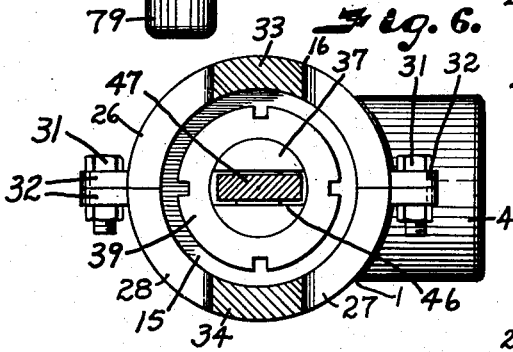
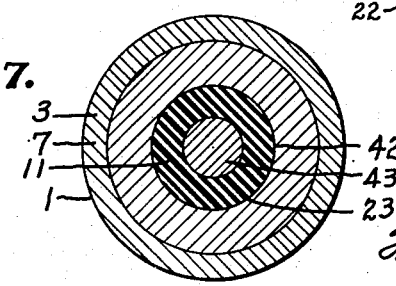
INVENTOR.
Byron C. Christensen
BY
Fishburn & Mullendore
ATTORNEYS

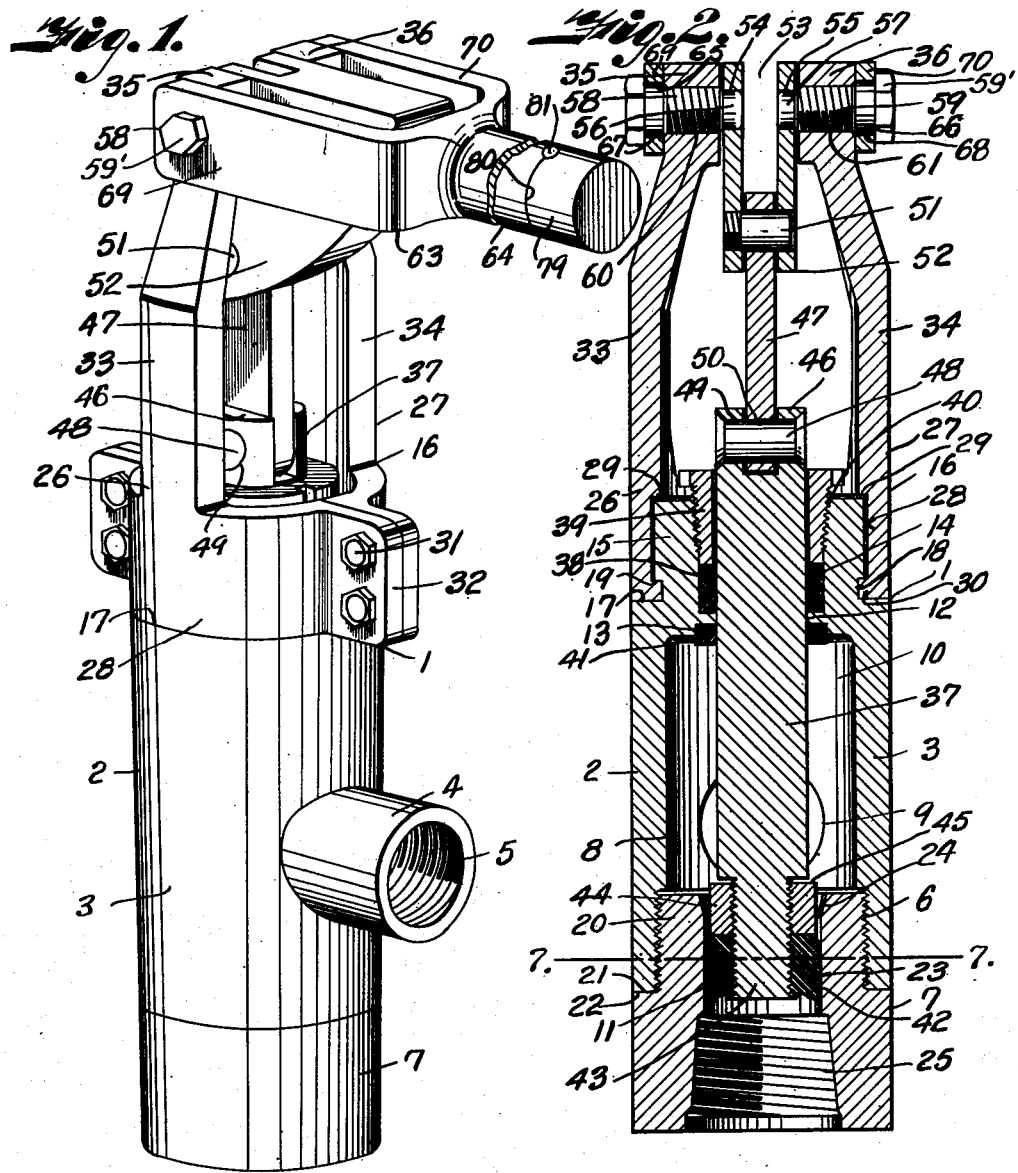

Patented July 7, 1953

2,644,486

UNITED STATES PATENT OFFICE 2,644,486

QUICK-OPENING VALVE

Byron C. Christensen, Oklahoma City, Okla., assignor to Drilling Equipment Mfg. Co., Oklahoma City, Okla., a corporation of Oklahoma Application August 28, 1948, Serial No. 46,567

7 Claims. (Cl. 137—704)

This invention relates to a valve of the type used in relieving fluid pressure in closed pressure systems, for example, the circulatory system through which a drilling fluid is circulated under pressure of a slush pump as in the rotary drilling of wells.

The principal objects of the invention are to provide a simple valve construction which permits rapid and convenient opening under high pressure conditions without incurring danger and possible injury to the operator; to provide a valve with positive means for sealing the fluid under the abnormal pressure conditions encountered in such systems; to provide a valve structure which does not require adjustment of the valve linkage, thereby promoting convenience and ease of operation as well as assuring complete and uneffected seal during operation under varied pressure conditions; to provide a valve structure which is not subject to erosion and cutting ordinarily caused by leakage by high velocity abrasive fluid; to provide a valve structure wherein the lever arm assembly may be conveniently positioned in any radial direction with respect to the axis of the valve for most convenient position of the operating lever without necessitating alteration in piping hookups; and to provide an automatic release of the lever when fluid flow acts to thrust the valve into fully open position during the time the valving member is being opened by the lever.

Other objects of the invention are to provide a simplified valve structure and operating linkage; to provide a construction which permits convenient removal and replacement of the valve parts; and to provide a valve having a full unrestricted flow when the valving member is in open position.

In accomplishing these and other objects of the invention, I have provided improved structure, the preferred form of which is illustrated in the accompanying drawing wherein:

Fig. 1 is a perspective view of a quick-opening valve constructed in accordance with the present invention.

Fig. 2 is a vertical section through the valve showing the valve closed.

Fig. 3 is a vertical section taken at right angles to the section illustrated in Fig. 2 and showing the valve open.

Fig. 4 is a plan view of the valve showing the lever swivelled to a different position relatively to the valve outlet.

Fig. 5 is a cross section through the lever on the line 5—5 of Fig. 3.

Fig. 6 is a cross section on the line 6—6 of Fig. 3.

Fig. 7 is a cross section on the line 7—7 of Fig. 2.

Referring more in detail to the drawings:

1 designates a quick-opening valve constructed in accordance with the present invention and which is adapted for use in relieving fluid pressure in closed pressure systems; for example, the circulatory system through which a drilling fluid is circulated by means of a mud or slush pump in rotary drilling rigs, the valve being used for releasing pressure in case of a plugged bit, blowout, pulling of the drill pipe or whenever quick release of pressure is desired.

The valve includes a T-shaped body member 2 having a cylindrical main portion 3 and a lateral branch 4. The branch 4 is internally threaded as at 5 or otherwise fitted to connect with the pressure relief side of the pressure system and the lower end of the tubular body is counterbored and internally threaded as at 6 to connect with a seat member 7. The axial bore 8 of the cylindrical portion 3 extends upwardly in intersection with the bore 9 in the lateral branch 4 in forming a chamber 10 into which a valving member 11 is adapted to be retracted when the valving member is in open position. Above the chamber 10 the bore continues in smaller diameter to provide an annular shoulder 12 on the respective sides of counterbores 13 and 14. The upper end of the body portion 3 is of reduced diameter to provide a neck 15 on which the valve bonnet or head 16 is mounted as later described. The neck thus forms an annular shoulder 17 with the valve body and formed in the neck portion just above the shoulder is an annular groove 18 to form a smaller upper shoulder 19 in facing relation with the shoulder 17. The member 7 comprises a cylindrical body substantially conforming to the exterior diameter of the body portion 3 of the valve and has a reduced threaded neck 20 adapted to engage the thread 6 when the neck is turned thereinto to seat an annular shoulder 21 on the seat member against the end face 22 of the valve body. The seat member has an axial bore 23 extending through the neck portion 20 and which terminates in an outwardly tapered counterbore 24 to facilitate entrance of the valving member as later described. The opposite end of the seat member is counterbored and internally threaded as indicated at 25 for connection with the pressure side of the system in which the valve is installed.

The bonnet or head 16 is formed of two sections 26 and 27 cooperating to provide a ring-like base portion 28 adapted to encircle the neck 15 of the valve body. The ring-like base portion 28 has upper and lower flanges 29 and 30 adapted to respectively engage within the groove 18 and over the upper end of the neck 15. The sections are secured together in encircling relation with the neck 15 by bolts 31 which extend through ears 32 on the respective sections. Each section also includes an upwardly extending arm 33 and 34 located on opposite sides of the ring-like base portion and which converge inwardly at their upper ends to provide terminals 35 and 36 on which the valve operating lever is pivotally mounted as later described.

Reciprocably and rotatably mounted within the neck portion of the valve body is a rod-like valve stem 37 having a sliding seal with respect to the valve body by packing rings 38 inserted within the counterbore 14 and retained in sealing relation with respect to the valve stem by a bushing or packing gland 39, the bushing or packing gland being threaded within the open end of the counterbore as indicated at 40. Seated in the counterbore 13 and suitably secured therein is a resilient ring 41 which also serves as a bumper for cushioning opening movement of the valving member 11.

The valving member 11 is of piston shape and preferably formed of resilient material having an outer circumferential face 42 substantially conforming with the diameter of the bore 23 to close flow therethrough when the valving member is in closed position (Fig. 2). The piston-like valving member is threaded onto a reduced threaded extension 43 and seats against a locking collar 44 that is also threaded on the valve stem as best shown in Figs. 2 and 3. The collar is preferably of larger diameter than the diameter of the valve stem so that it cooperates in forming an annular stop 45 adapted to abut the cushioning ring 41 shown in Fig. 4.

The valve stem extends upwardly between the arms 33 and 34 and has a bifurcated end 46 to receive one end of a link 47 that is retained therein by a cross pin 48, the cross pin extending through openings 49 in the valve stem and through a registering opening 50 in the link. The opposite end of the link is connected by a pin 51 with a cam head 52. The cam head is in the form of a quadrant with the radial side carrying the pin 51, provided with a slot 53 to accommodate the link 47 when the parts are in valve open position shown in Fig. 3. The axial center of the quadrant has openings 54 and 55 receiving trunnion terminals 56 and 57 of trunnion screws 58 and 59 which screws are threaded into openings 60 and 61 of the arms 33 and 34. The terminals 56 and 57 thus form pivots on which the cam head 52 is adapted to turn when the valve is moved to and from closing position as later described.

In order to provide support for a yoke 63 of an operating lever 64, the outer ends of the trunnion screws have enlarged bearing portions 65 and 66 which project from the outer sides of the arms 33 and 34 to engage in bearing openings 67 and 68 of arms 69 and 70 of the lever yoke 63. To facilitate insertion of the trunnion screws 58 and 59, the outer ends are provided with polygonal-shaped heads 59'.

In order to provide a safety connection between the yoke 63 of the operating lever 64 and the cam head 52, the lever 64 is provided with a latch 71 that is adapted to be selectively operated to swing the cam head to and from opening and closing position and which is adapted to effect release of the lever in case the cam head should be moved by the pressure faster than the lever is moved by the operator.

In carrying out this feature of the invention, the lever has an axial bore 72 extending therethrough and which terminates at the yoke and in a counterbore 73 that forms an annular shoulder 74 to seat a spring 75. Rotatably mounted in the bore 72 is a rod 76 that projects into the counterbore and is provided with a head or flange 77 to close the outer end thereof and carry the latch 71. The spring 75 is sleeved about the rod 76 and has one end engaging against the shoulder 74 and its opposite end engaging against the flange 77 to keep the latch in contact with the cam head and within a notch 78 as shown in Fig. 3. The opposite end of the rod projects from the lever and carries a cap 79 which when the latch 71 is in engagement with the notch 78 abuts against the end face 80 of the lever. Extending radially from the rod is a pin 81 that engages in one or the other of diametrically opposed grooves 82 and 83 that are provided in the abutting end face 80 of the lever whereby the latch may be held in its respective positions when the cap is pulled outwardly and turned to engage the pin 81 with the end face 80. The latch includes a flat tongue-like extension having a straight face 84 on one side and a bevelled face 85 on the other which are adapted to face the sides 86 or 87 of the notch 78.

In using a quick-opening valve assembled and constructed as described, it is mounted in the pressure system at a point where the lever 64 is in convenient reach of the driller with the port or seat member 7 connected into the pressure side of the system and the lateral branch 4 to the pressure relief side of the system. After connection of the body portion 3 of the valve body member 2, the lever 64 may be adjusted to the desired working directions (compare Figs. 1 and 4) by loosening the bolts 31 so that the ring-like base portion 28 of the bonnet or head 16 may be turned on the neck 15 to bring the operating lever 64 into desired operating plane. This adjustment is possible because the valving member and valve stem are free to rotate as a unit in the valve body. The bolts 31 are then tightened to clamp the sections of the bonnet or head 16 about the neck 15 whereupon the bonnet or head is prevented from turning on the body of the valve to move the lever out of its adjusted position.

Assuming that the valving member 11 is open as shown in Fig. 3, it is retracted within the chamber 10 giving flow through the bore 9 of the branch 4. In this position of the valving member the link 47 is in the groove or slot 53 of the cam head 52 and the cam head is extending laterally from one side of the valve body. In this position the sector-shaped cam is in its uppermost position and supports the valve stem and valving member. The lever 64 may have been released from the cam head or the flat face 84 of the latch 71 may have been left in contact with the side 87 of the notch 78, in which case the cap 79 of the lever is pulled outwardly against action of the spring 75 to free the pin 81 from the notch 82 (Fig. 3) and permit rotation of the cap 79 and latch 71. When the cap 79 has been turned 180° the pin 81 will then register with and drop into the notch 83 which allows the latch to again enter the notch 78 but this time the flat face 84 of the latch 71 is engaging the side 86 of the notch. The valve may then be moved to closed position by swinging the lever arm clockwise (Fig. 3) upwardly and across top dead center with the cam head 52 swinging on the terminals 54 and 55 of the trunnion screws 58 and 59 and the yoke arms 69 and 70 pivoting about the bearing portions 65 and 66. This movement of the cam head carries the pin 51 across the top dead center to apply a downward force on the link 47 and move the valve stem 37 downwardly through the packing gland 39 until the valving member 11 enters the cylindrical valve seat or bore 23 whereupon the lever 64 is positioned at the opposite side of the valve body as shown in Fig. 1. The axes of the pins are again in substantially vertical alignment with the axes of the trunnion terminals but the pin 51 has passed slightly off dead center position to lock the valve in closing relation with the valve seat.

When the valving member has passed into the bore or seat 23, the valve is closed and pressure is maintained within the system. The pressure acting against the valving member from the underside forces the sides thereof into sealing relation with the cylindrical valve seat.

It will be obvious that since no definite seating of the valve is required within the bore 42, the extent of movement of the lever is not critical, it only being necessary that the valving member is within the bore to effect the closure. Therefore, there is no danger of a partly unseated valve that may cause leakage and result in subsequent damage by erosion of leaking fluid passing between the valve and its seating surface.

This structure is also important as no adjustment is required between the valve stem and actuating lever to maintain an effective closure. It is also obvious that any wear on the moving mechanism is of no consequence.

When it is desired to relieve the pressure, the cap 79 on the end of the operating lever 64 is turned to bring the pin 81 into engagement with the opposite notch 82 so that the flat side of the latch 71 engages the side face 84 of the notch 78. The lever may then be swung to lift the valving member out of the seat or bore 23 and into its retractive position within the chamber 10, leaving a full unrestricted flow of the fluid through the body of the valve.

Since the valve is being opened with the aid of the pressure acting on the bottom of the valving member 11 the pressure may tend to operate the cam head faster than it is being moved by the lever, but this will have no effect on the lever because side 86 of the notch 78 is bearing against the lever 85 to effect disengagement of the latch. The cam head is then free to snap over without jerking the lever or injuring the operator.

When it becomes necessary to replace the valving member for inspection or replacement, the valve body member is disconnected from the pressure system and the seat member 7 is unthreaded from the part 2. After removal of and loosening of the packing 38, the stem and valving member assembly are readily withdrawn through the bore 8.

From the foregoing it is obvious that I have provided a quick-opening valve of the reciprocating stem type which is quickly and easily operated under high pressure conditions without incurring danger and possible injury due to loss of control in operating the valving member. It is also obvious that I have provided a simple and efficient seal of the valving member and which requires no adjustment of the working parts in maintaining such seal. It is further obvious that the position of the operating lever is readily changed without requiring a change in the piping system when the valve is to be installed in an existing piping system.

What I claim and desire to secure by Letters Patent is:

1. In a valve of the character described including a valve body, a valving member reciprocable within the valve body, a valve stem connected with the valving member and extending coaxially through the valve body, and a valve bonnet connected with the valve body, a valve operating means including an operating lever pivotally connected with the valve bonnet, a latch engaging member pivoted to swing with the operating lever and having a latch engaging portion, a link connecting the valve stem with said latch engaging member, a rod reciprocably and oscillatably supported in the operating lever, a latch on said rod having oppositely positioned straight and bevelled faces adapted to engage said latch engaging portion of the latch engaging member, a cap forming an extension of the operating lever and connected with said rod for turning the rod to position the latch in engagement with said latch engaging portion, a spring carried by the operating lever and normally retaining the latch in engagement with said latch engaging portion, and cam means on the cap and engaging cam portions on the lever for retracting the latch against action of said spring and for retaining the latch faces in selected positions with respect to the latch engaging portion.

2. In a valve having a valve body, a valve stem extending coaxially from an end of the valve body, and a valve bonnet connected with the end of the valve body having the projecting end of the valve stem, operating means for the valve stem including an operating lever pivotally connected to the valve bonnet, a latch engaging member adapted to swing with the operating lever and having a latch engaging portion, a link connecting the valve stem with said latch engaging member, a rod reciprocably and oscillatably supported in the operating lever, a latch on said rod having oppositely positioned straight and bevelled faces adapted to engage said latch engaging portion of the latch engaging member, a cap forming an extension of the operating lever and connected with said rod for turning the rod to position the latch in engagement with said latch engaging portion, a spring carried by the operating lever and normally retaining the latch in engagement with the latch engaging portion, and cam means on the cap and engaging cam portions on the lever for retracting the latch against action of said spring, and for retaining the latch faces in selected positions with respect to the latch engaging portions.

3. In a valve of the character described including a valve body having a reduced neck portion provided with an annular groove, and a valving member rotatably movable within the valve body, means for operating the valving member including a stem connected with the valving member and extending through said neck portion, a bonnet on the valve body comprising mating sections forming a split ring encircling said neck portion and having an annular flange engaging in said groove and having diametrically opposed arms, trunnions carried by the arms, a sector-shaped cam pivoted on the trunnions, a link connecting the sector-shaped cam with the valve stem, a yoke pivotally connected with the arms coaxially of the trunnions, a lever projecting from the yoke, a latch carried by the lever and engageable with the sector-shaped cam to connect the lever with said cam, said clamping sections being turnable about the neck portion without disconnecting said link and means for clamping said sections about said neck to retain the lever in a fixed operating plane.

4. In a valve of the type including a valve body member having an axial inlet and a lateral outlet, a cylindrical valve member reciprocable into and from a cylindrical valve seat coaxially with the inlet and intermediate said inlet and outlet and a valve bonnet connected with the valve body and including upwardly extending rigid arms, an actuating mechanism for the valving member including a valve stem connected with the valving member and extending through the valve bonnet, an operating lever, means pivotally connecting the operating lever with said rigid arms of the valve bonnet on a transverse axis, a latch engaging member pivoted to swing on the transverse axis, a link connecting the valve stem with said latch engaging member, and a latch carried by the operating lever and adapted to latch with said engaging member to connect the operating lever for operating the valving member when the operating lever is pivoted from one side of the valve axis to the other.

5. In a valve of the type including a valve body member having an axial inlet and a lateral outlet, a cylindrical valve member reciprocable into and from a cylindrical valve seat coaxially with the inlet and intermediate said inlet and outlet and a valve bonnet connected with the valve body and including upwardly extending rigid arms, an actuating mechanism for the valving member including a stem connected with the valving member and extending through the valve bonnet, an operating lever, means pivotally connecting the operating lever with the rigid arms of the valve bonnet on a transverse axis, a latch engaging member pivoted to swing on the transverse axis, a link connecting the valve stem with said latch engaging member, a latch carried by the operating lever and adapted to latch with said engaging member to connect the operating lever for operating the valving member when the operating lever is pivoted from one side of the valve axis to the other, said valve bonnet being swivelly connected with the valve body to turn with the valve stem and valving member, and means for clamping the valve bonnet to the valve body for retaining the lever in a desired operating plane relatively to said outlet.

6. In a valve of the type including a valve body member having an axial inlet and a lateral outlet, a cylindrical valve member reciprocable into and from a cylindrical valve seat coaxially with the inlet and intermediate said inlet and outlet and a valve bonnet connected with the valve body, an actuating mechanism for the valving member including a stem connected with the valving member and extending through the valve bonnet, diametrically spaced apart arms extending from the valving member in parallel relation with the stem being reciprocable therebetween, means for mounting the arms rigidly on the valve body in the longitudinal axial direction of the valve member, trunnions carried by the arms, a sector-shaped cam pivoted on the trunnions, a link connecting the sector-shaped cam with the valve stem, a yoke pivotally connected with the arms coaxially of the trunnions, a lever projecting from the yoke, and a latch carried by the lever and engageable with the sector-shaped cam to connect the lever with said cam.

7. In a valve of the type including a valve body member having an axial inlet and a lateral outlet, a cylindrical valve member reciprocable into and from a cylindrical valve seat coaxially with the inlet and intermediate said inlet and outlet and a valve bonnet connected with the valve body, an actuating mechanism for the valving member including a valve stem connected with the valving member and extending through the valve bonnet, packing means carried by the valve body in sealing engagement with the valve stem, diametrically spaced apart arms extending from the valving member in parallel relation with the stem being reciprocable therebetween, means for mounting the arms rigidly on the valve body in the longitudinal axial direction of the valve member, trunnions carried by the arms, a sector-shaped cam head on the trunnions, a link connecting the sector-shaped cam with the valve stem, a yoke pivotally connected with the arms coaxially of the trunnions, a lever projecting from the yoke, a latch for connecting the cam head with the lever on differential movement of the valve member under pressure when the valve member is being moved by the lever, and a cushioning ring carried by the valve body in the path of the valve member to cushion the valve member upon said release of the lever.

BYRON C. CHRISTENSEN.

References Cited in the file of this patent

UNITED STATES PATENTS

| Number | Name | Date |
| --- | --- | --- |
| 217,540 | Kerr | July 15, 1879 |
| 625,437 | Donat | May 23, 1899 |
| 633,351 | Tillinghast | Sept. 9, 1899 |
| 912,604 | Olsson | Feb. 16, 1909 |
| 1,287,698 | Kiley | Dec. 17, 1918 |
| 1,537,505 | Smith | May 12, 1925 |
| 1,606,191 | Siebenmann | Nov. 9, 1926 |
| 1,654,516 | Wilson | Dec. 27, 1927 |
| 1,900,764 | Rowley | Mar. 7, 1933 |
| 1,973,744 | Brown | Sept. 18, 1934 |
| 2,184,793 | Clench | Dec. 26, 1939 |
| 2,244,100 | Cole | June 3, 1941 |